(12) United States Patent
Shiraishi et al.

(10) Patent No.: US 8,577,096 B2
(45) Date of Patent: Nov. 5, 2013

(54) IMAGE ENCODING APPARATUS AND CONTROL METHOD THEREOF

(75) Inventors: Yuki Shiraishi, Tokyo (JP); Takeshi Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 999 days.

(21) Appl. No.: 12/634,256

(22) Filed: Dec. 9, 2009

(65) Prior Publication Data

US 2010/0158401 A1    Jun. 24, 2010

(30) Foreign Application Priority Data

Dec. 19, 2008  (JP) ................. 2008-324708
Sep. 17, 2009  (JP) ................. 2009-216171

(51) Int. Cl.
*G06K 9/34* (2006.01)
(52) U.S. Cl.
USPC ............ 382/118; 382/239; 382/243; 382/250
(58) Field of Classification Search
None
See application file for complete search history.

(56) References Cited

U.S. PATENT DOCUMENTS

2005/0237380 A1* 10/2005 Kakii et al. ............... 348/14.12

FOREIGN PATENT DOCUMENTS

| JP | 06-067300 | 3/1994 |
|---|---|---|
| JP | 06-083553 | 3/1994 |
| JP | 2002-271790 A | 9/2002 |
| JP | 2004-072555 A | 3/2004 |
| JP | 2005-027076 A | 1/2005 |
| WO | 2008/103766 A2 | 8/2008 |

OTHER PUBLICATIONS

Andrew P. Bradley et al. (Visual Attention for Region of Interest Coding in JPEG 2000; Journal of Visual Communication and Image Representation, R. 14, published 2003, pp. 232-250).*
Krishnaraj Varma et al. (JPEG 2000—Choices and Tradeoffs for Encoders; IEEE Signal Processing Magazine, published Nov. 2004, pp. 70-75).*
Mar. 11, 2013 Japanese Office Action, without an English Translation, that issued in Japanese Patent Application No. 2009-216171.

* cited by examiner

*Primary Examiner* — Brian P Werner
(74) *Attorney, Agent, or Firm* — Cowan, Liebowitz & Latman, P.C.

(57) ABSTRACT

An encoding apparatus encodes an image by tile in a smallest possible size while suppresses segmentation of a specific region in the image into tiles. Vertical lines at left and right ends of n-th face region are defined as boundary candidate vertical lines Lh(n) and Lm(n), and horizontal lines at upper and lower ends of the n-th region, as boundary candidate horizontal lines Lu(n) and Ls(n). A divider determines a horizontal line of another region existing within the range of the horizontal lines Lu(n) and Ls(n) of the n-th region as a line to be deleted. Further, the divider determines a vertical line of another region existing within the range of the vertical lines Lh(n) and Lm(n) as a line to be deleted. This processing is performed to the final region, then image data is divided using horizontal and vertical lines except the lines determined as lines to be deleted.

12 Claims, 11 Drawing Sheets

F I G. 2
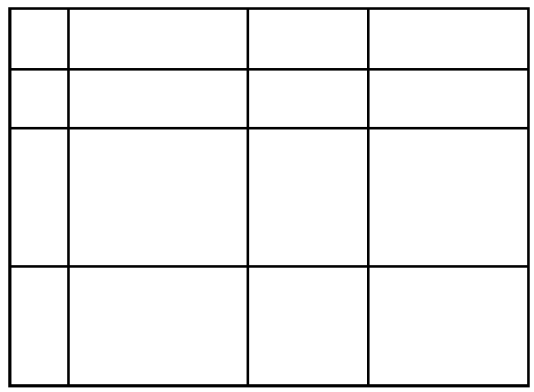
F I G. 3
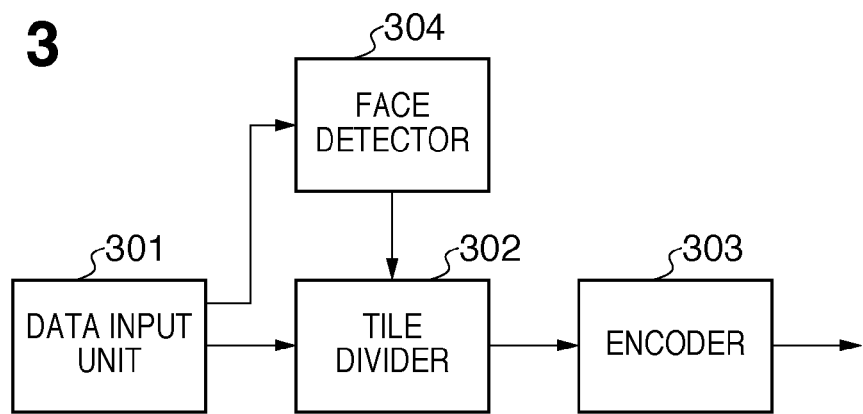
F I G. 4
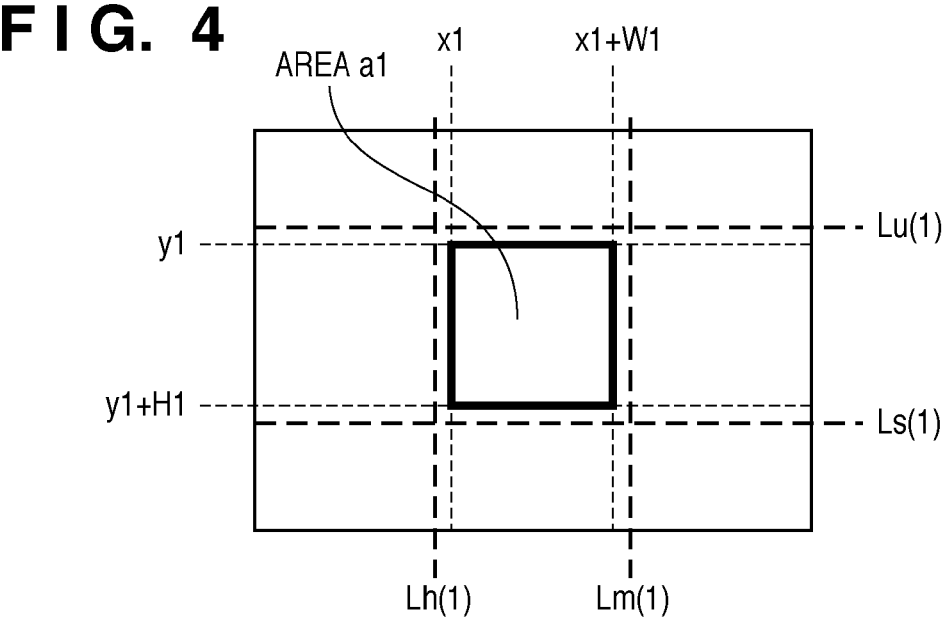

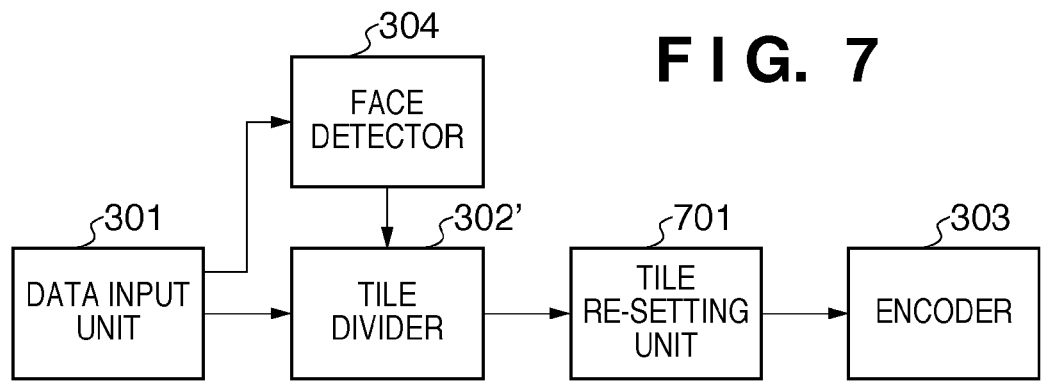
F I G. 7
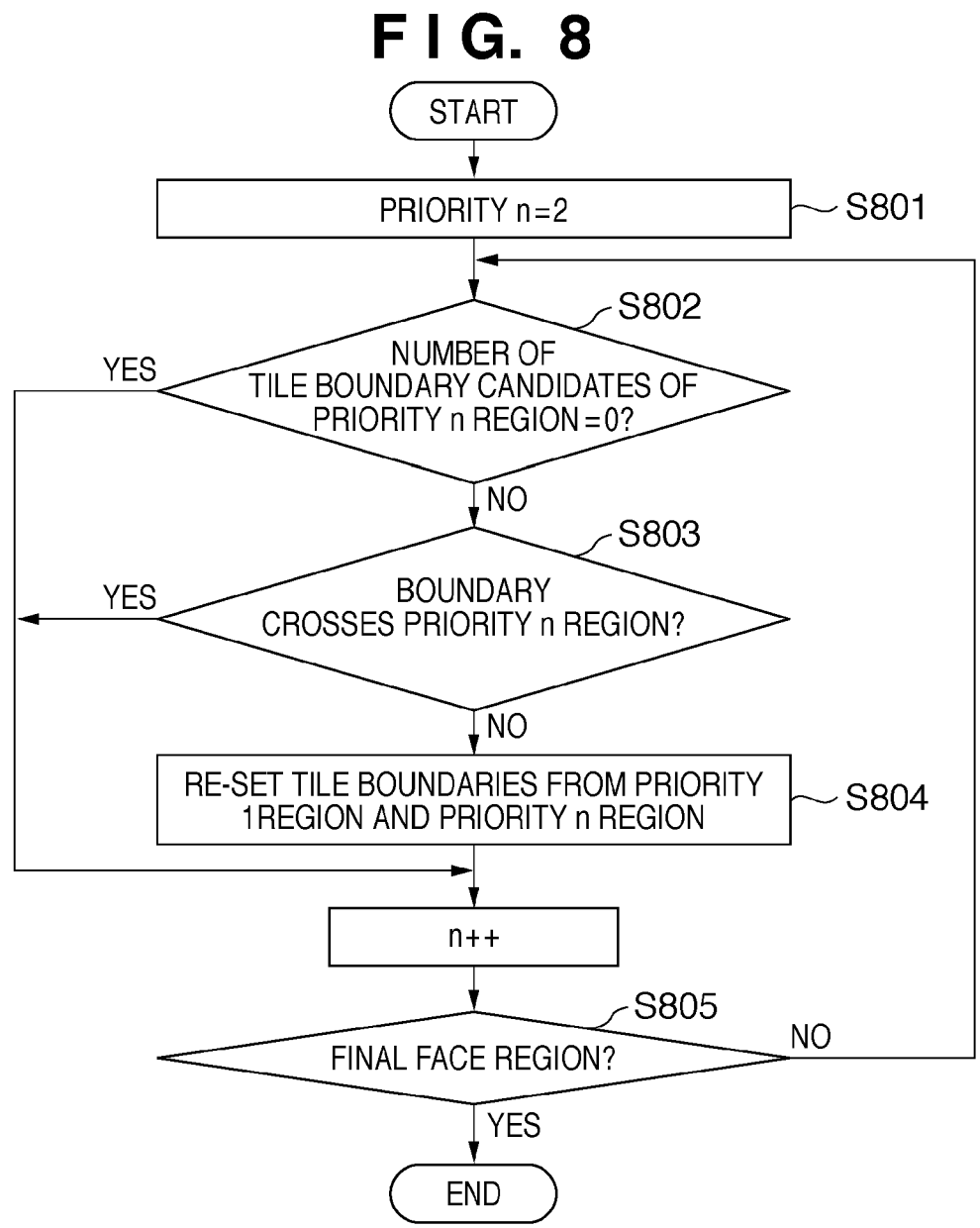
F I G. 8

FIG. 12
| PRIORITY | CONDITION |
|---|---|
| 1 | REGION SIZE |
| 2 | REGION POSITIONED IN A LOWER PART OF PICTURE |
| 3 | REGION POSITIONED AWAY FROM HIGH PRIORITY REGION |
FIG. 13
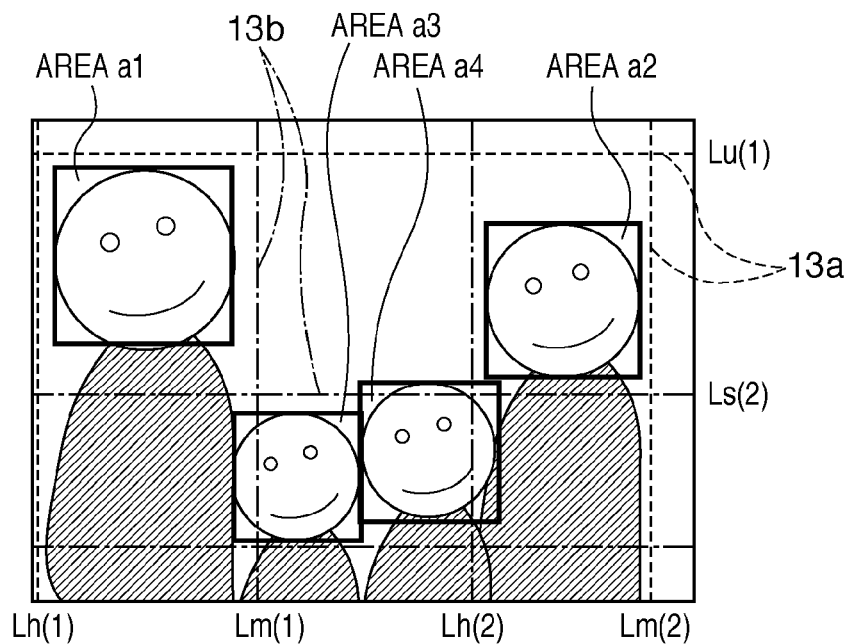
FIG. 14
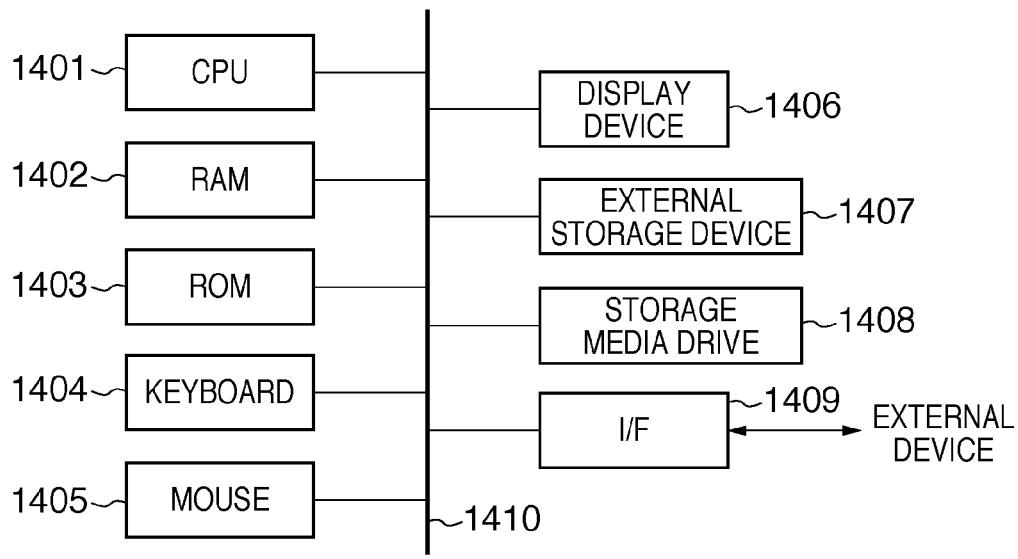

F I G. 16
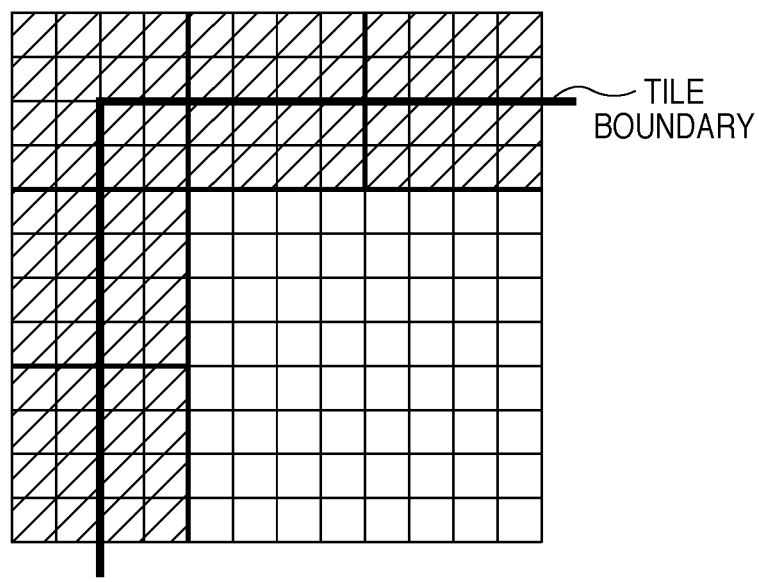
F I G. 17
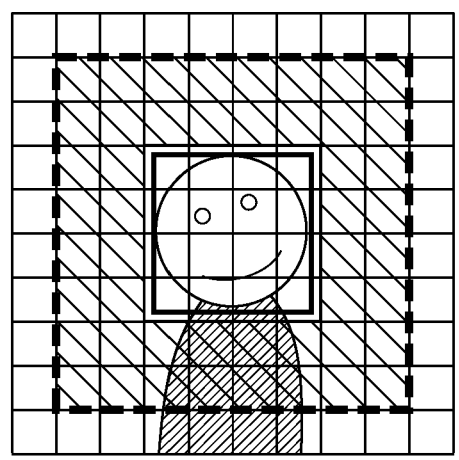

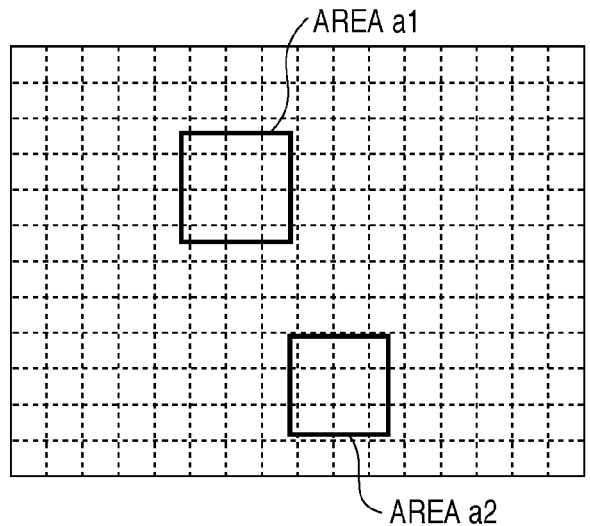
FIG. 19A
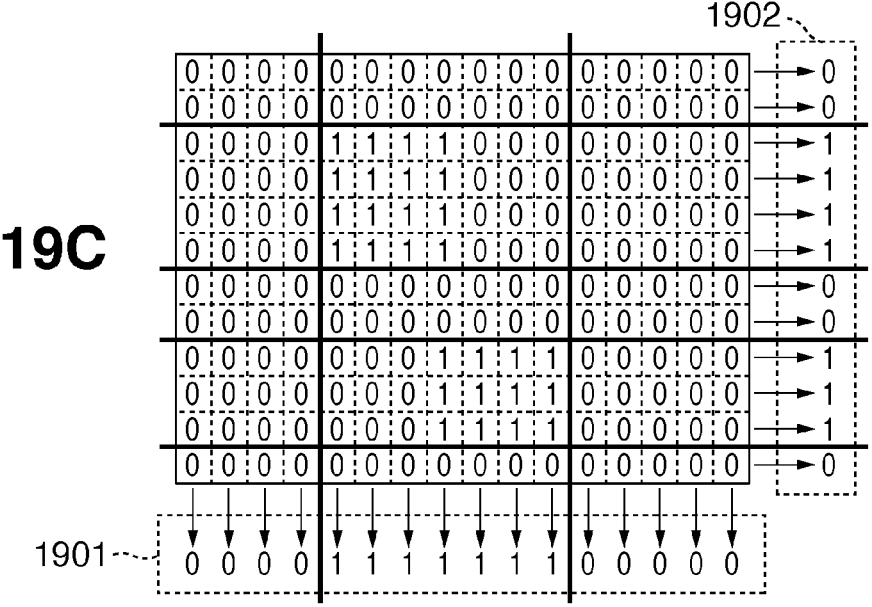
FIG. 19B
FIG. 19C

IMAGE ENCODING APPARATUS AND CONTROL METHOD THEREOF

BACKGROUND OF THE INVENTION

1. Field of the Invention

The present invention relates to a technique for encoding image data.

2. Description of the Related Art

A technique of dividing a still image into tiles and encoding the image by tile is known. For example, as one function in JPEG 2000 (ISO/ITU 15444-1:2000), tile division processing for dividing an image into small regions and independently encoding the small regions is adopted. Note that because the details of the JPEG 2000 method are described in international standard recommendations and the like, the details will be omitted here.

Because an image region can be specified by tile, it is possible, when executing tile division processing, to decode only a tile to be processed without processing regions other than the tile to be processed in an encoded state. Thus, image editing and image processing can be performed on only the tile to be processed.

However, because a tile size is fixed in the conventional image encoding, it is inconvenient to efficiently decode only a specific region. In other words, in an image, to encode a specific region to be processed in a manner convenient for processing, it is important to express the specific region using as small a number of tiles as possible and to reduce the tile size.

Regarding the tile size, when the specific region to be processed is fragmented or when the specific region to be processed is divided by a unit much larger than the specific region, access time to the specific region to be processed is prolonged. Further, when filter processing is performed over tiles, in the case of partial decoding by each tile, the image quality is degraded around tile boundaries. At this time, degradation of the region of interest is conspicuous when e.g. the specific region is decoded and displayed.

Further, in a case where the tile size is not fixed and tiles are obtained in a size the same as or close to that of the specific region to be processed, the compression ratio is lowered only in the specific region where excellent image quality must be maintained when performing encoding processing, while in other regions, the compression ratio is raised when performing encoding processing because the image quality may be degraded by some small measure. In this manner, encoding efficiency can be improved for the entire image.

As described above, image encoding for a tile having a variable tile size is required. Note that it is necessary to take the efficiency of encoding into consideration. Accordingly, the present inventor employs tile division where the width and height of a tile are variable, but each row has a fixed height and each column has a fixed width as in the case of cells in a table calculation application. More particularly, an image is tile-divided as shown in FIG. 2. In this division, as the tile size can be changed by only changing a ruled line position, the tile size in the image can be variable with a simple method. Because the tile size is variable in the image, access time to an object of interest is reduced. Further, because an appropriate compression method is applied to each tile, the compression efficiency can be improved.

As a conventional technique for allocating an appropriate sized tile to an object of interest, Japanese Patent Laid-Open No. 6-067300 as follows is known. The size of a face to be photographed is measured with an optical sensor or the like, and the scaling of the photographed image is changed based on the measured face size; in this way, a photograph in a standard size such as a photograph for a certification can be formed.

Further, a technique for, upon formation of a table, adjusting a cell size in correspondence with the size of character string or figure, e.g., Japanese Patent Laid-Open No. 6-083553 is known.

However, although methods for determining a cell size in correspondence with one object as in the case of the above-described method are known, a method for setting a tile in a smallest possible size for plural objects and performing encoding has not been proposed.

SUMMARY OF THE INVENTION

The present invention has been made in view of the above-described conventional art. The present invention provides a technique for performing encoding by tile while suppressing segmentation of a specific region in an image into tiles, using a smallest possible tile size.

According to one aspect, the invention provides an image encoding apparatus for dividing an image into rectangle regions and encoding image data in each rectangle region, comprising: a region detector that detects a specific region in image data; a tile divider that determines positions of a vertical line and a horizontal line as boundaries to divide the image into a plurality of tiles having the same height in the same row and the same width in the same column, in accordance with coordinates of each rectangle region including each specific region detected by the region detector; and an encoder that divides the image data in accordance with the horizontal and vertical lines set by the tile divider and encodes a partial image in each divided region as the tile.

According to the present invention having the above structure, it is possible to perform encoding by tile while suppressing segmentation of a specific region in an image into tiles, using a smallest possible tile size. As a result, the degradation of image quality in a tile boundary due to segmentation of the specific region into tiles can be prevented. Further, upon partial decoding, as it is possible to set a tile size in consideration of a range influenced by filter processing or the like, the degradation of image quality in the specific region can be suppressed.

Further features and aspects of the present invention will become apparent from the following description of exemplary embodiments (with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 illustrates an example of variable tile division;

FIG. 3 is a block diagram of an image encoding apparatus according to the first embodiment;

FIG. 4 illustrates an example of the positions of tile boundary candidates;

FIG. 7 is a block diagram of the image encoding apparatus according to a second embodiment;

FIG. 8 is a flowchart showing a processing procedure by a tile re-setting unit according to the second embodiment;

FIG. 12 is a table showing the priorities of face regions;

FIG. 13 illustrates a particular example of the processing by the tile re-setting unit;

FIG. 14 is a block diagram of an information processing apparatus when the first embodiment is realized with a computer program;

FIG. 16 illustrates an example of filtering over a tile boundary;

FIG. 17 illustrates an example of a tile boundary set so as not to cause degradation of image quality in a detection area;

FIGS. 19A to 19C are examples of the tile division processing according to the fourth embodiment.

DESCRIPTION OF THE EMBODIMENTS

Figure 1:
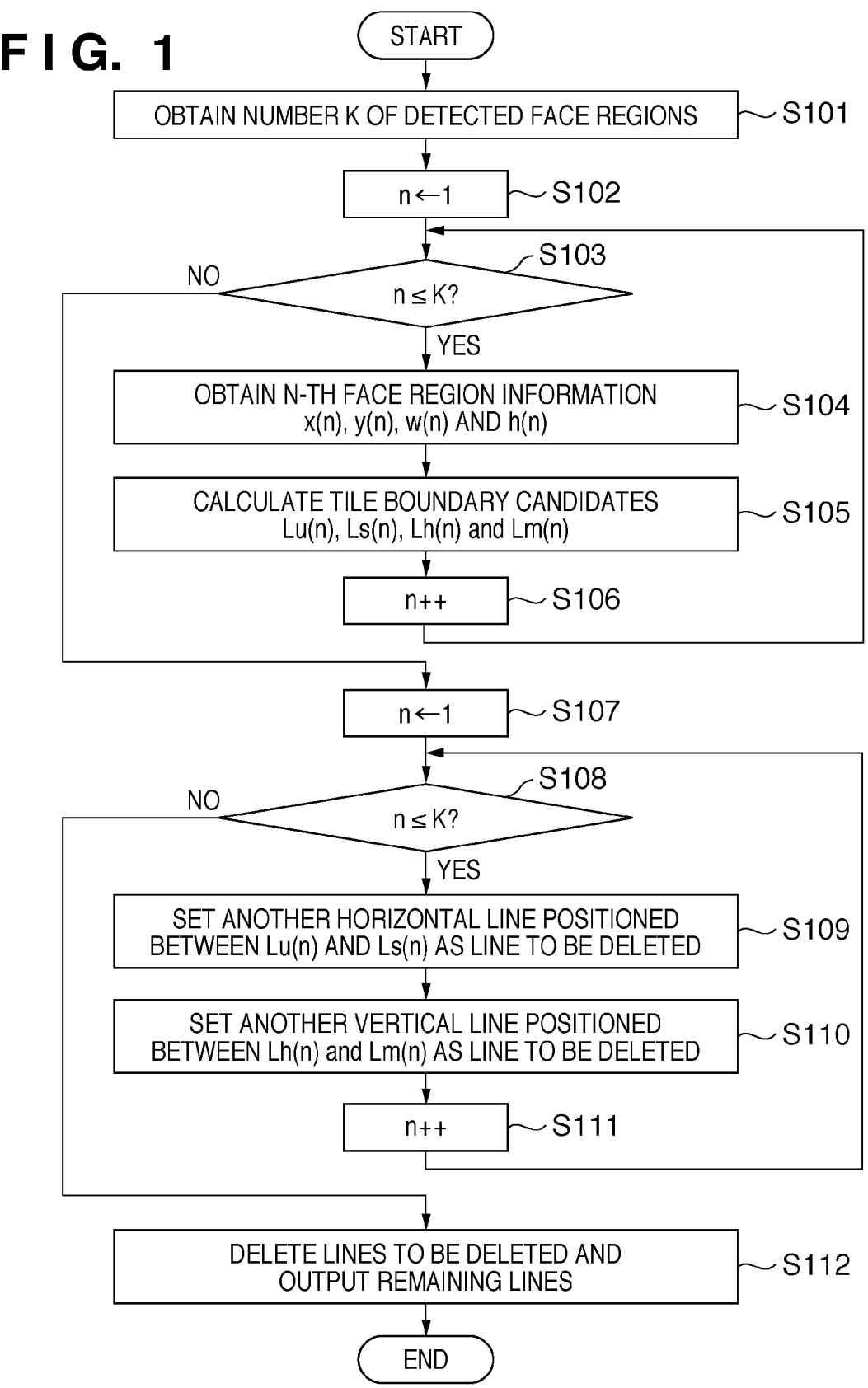
FIG. 1 is a flowchart showing a processing procedure by a tile divider according to a first embodiment.

Hereinbelow, preferred embodiments of the present invention will now be described in detail in accordance with the accompanying drawings.

First Embodiment

In the first embodiment, a tile boundary is set based on positional relation among face detection results, and thereby two or more face regions are respectively set within a smallest possible sized tile. Further, for the sake of simplification of explanation, the description of the embodiment will be made on the presupposition that an image encoding apparatus in the present embodiment is incorporated in an image capturing apparatus such as a digital camera.

FIG. 3 is a block diagram of the image encoding apparatus according to the first embodiment.

As shown in FIG. 3, the image encoding apparatus according to the present embodiment has a data input unit 301, a tile divider 302, an encoder 303 and a face detector 304.

The data input unit 301 inputs image data obtained by an image sensing device of the digital camera. The face detector 304 detects a face region (specific region) of a person in the input image data, and outputs information regarding the detected respective face regions to the tile divider 302. Note that since the technique for detecting regions containing a person's face from a photographed image is well known, an explanation of the technique will be omitted.

Note that when the upper left corner of the image is defined as the origin (the coordinates are "0,0"), the horizontal rightward direction (the X-axis), and the vertical downward direction (the Y-axis), the information regarding the face region refers to information specifying the position and size of a rectangle region, circumscribing the face region, with respective sides parallel to the X-axis or Y-axis. In the present embodiment, the coordinates of the upper left corner of the rectangle region, the width of the rectangle region in the horizontal direction and the height in the vertical direction are used as information regarding the face region. Note that the information regarding the face region may be information regarding the coordinates of the upper left corner and lower right corner of the rectangle region.

Further, in the present embodiment, because image encoding will be described, the coordinate position of the upper left corner of the tile and the size (height and width) of the tile are respectively an integral multiple of the encoding unit.

The tile divider 302 divides the image into tiles based on the image data inputted from the data input unit 301 and the data on the face regions from the face detector 304. The details of tile division will be described later.

The encoder 303 inputs partial image data (tile data) obtained by the tile division by the tile divider 302, performs encoding on the partial image data (tile) as an encoding unit, and thus generates coded data.

As an encoding method, in the present embodiment, the JPEG encoding method (ISO/IEC 15444-1) generally known as a still image encoding technique is used. In the JPEG encoding, first, input image tile data is divided into pixel blocks each having 8 pixels in the vertical direction and 8 pixels in the horizontal direction (minimum encoding unit). Then DCT transformation is performed by this pixel block and 8×8 frequency component coefficients (hereinbelow, "DCT coefficients") are obtained. Among the 8×8 DCT coefficients, the coefficient at the upper left corner indicates a DC (Direct Current) component, and the remaining 63 coefficients, AC (Alternating Current) components. Next, the respective DCT coefficients are quantized by referring to a previously set quantization table. The quantized respective DCT coefficients are entropy-encoded and outputted as coded data. As an entropy encoding method, Huffman encoding and Arithmetic encoding are known. The DC coefficient and the AC coefficients are encoded by respectively different procedures. In the JPEG Baseline, as a coefficient entropy encoding method, Huffman encoding is adopted. The DC coefficient and the AC coefficients are encoded by respectively different procedures. Regarding the DC component in the pixel tile of interest, a difference value from a DC component in its immediately-previous pixel tile (predictive value) is calculated, and the DC component in the pixel tile of interest is encoded. On the other hand, the respective AC components in the pixel tile of interest are Huffman-encoded using a combination of zero-run and non-zero coefficients.

Figure 15:
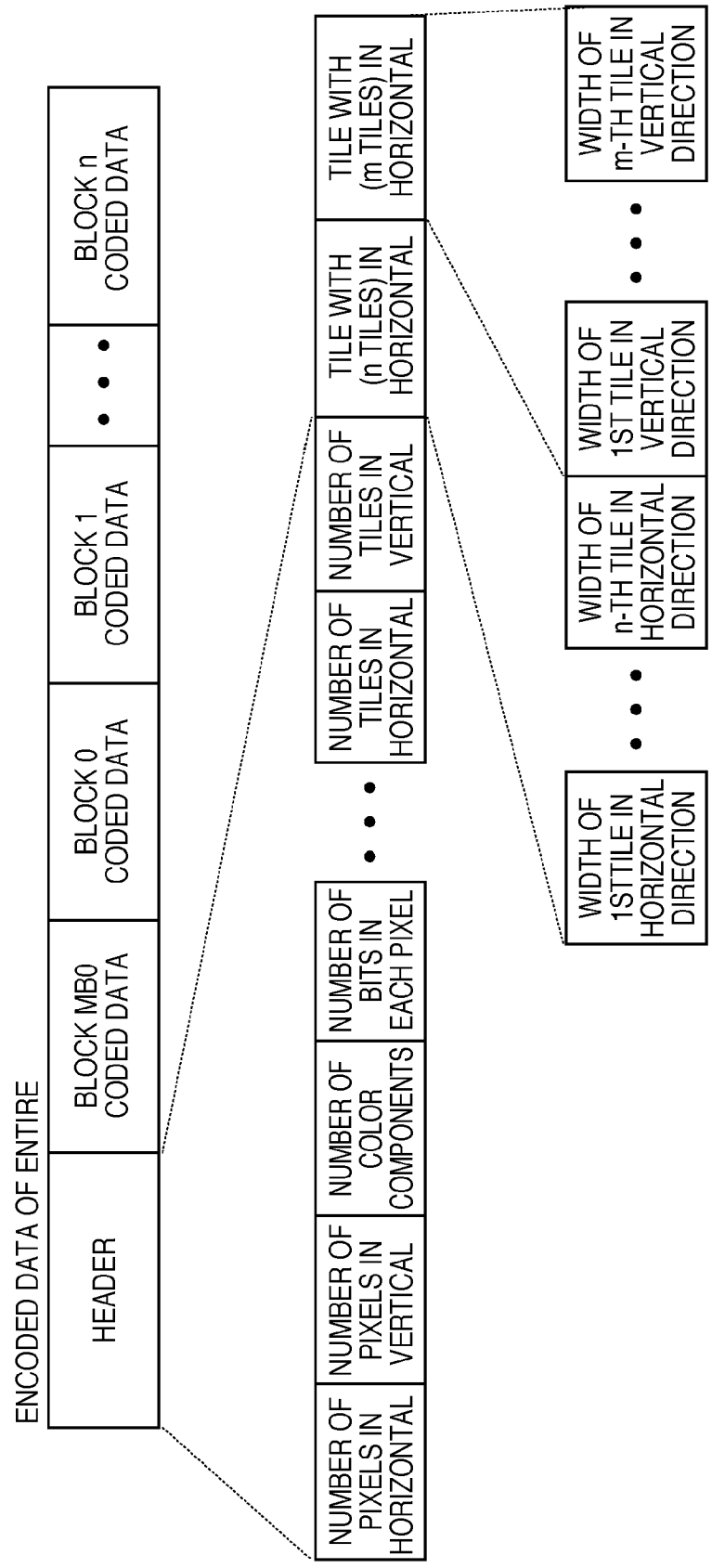
FIG. 15 illustrates an example of the structure of coded data generated in the first embodiment.

By the above-described method, encoded data is generated by tile. FIG. 15 illustrates an example of the structure of coded data from original image data generated as above. In a file header, the number of pixels in the horizontal direction in the image, the number of pixels in the vertical direction, the number of color components, the number of bits in each pixel, and the like, are stored. It is necessary to hold the number of tiles in the vertical direction in the image, the number of tiles in the horizontal direction, and the width of the n-th tile in the horizontal direction and the height of the n-th tile in the vertical direction. The tile width or height may be the number of pixels or a minimum encoding unit, the number of MBs. That is, on the decoding side, by analyzing the header, the tile data on each tile can be obtained. Note that in each tile, the information specifying a tile of a specific region (face region in the present embodiment) may be included in the header. For example, it may be arranged such that tile numbers are assigned to the tiles in raster scan order, and a tile number including a face region is stored in the header.

Further, coded data on all the tiles of the image follows the header. Note that the data structure of the finally generated coded data is not limited to that shown in FIG. 15 as long as various data necessary for decoding are included as the header. The coded data is outputted to the outside of the apparatus. Note that the encoding method is not limited to the JPEG method as long as encoding can be performed by tile.

FIG. 1 is a flowchart showing a processing procedure of the tile divider 302. Hereinbelow, the processing procedure of the tile divider 302 will be described in accordance with FIG. 1.

First, at step S101, the tile divider 302 determines a number K of detected face regions in accordance with the data on the face regions supplied from the face detector 304. Then at step S102, the tile divider 302 initializes a variable n to specify a face region to "1". At step S103, the tile divider 302 determines whether or not the value of the variable n is less than or equal to the number K of face regions. When it is determined that n≤K holds, the process proceeds to step S104.

At step S104, the tile divider 302 obtains information regarding the n-th face region. As the face region is a rectangle region as described above, the face region information is the upper-left corner coordinates {x(n), y(n)}, width w(n) and height h(n) of the rectangle region.

Next, at step S105, the tile divider 302 calculates candidates for tile boundaries from the obtained face region information. The candidate for tile boundary means the position of a tile boundary when respective face regions are included in a minimum-sized tile. For example, when a minimum tile including an area a1 in FIG. 4 is cut out, the tile boundaries in the vertical direction are set as x(1) and x(1)+w(1), and the tile boundaries in the horizontal direction are set as y(1) and y(1)+h(1). Note that because encoding is performed by tile, the coordinates of the tile boundary candidates are integral multiples of the minimum encoding unit (8×8 in the JEPG encoding).

In the area a1 in FIG. 4, when the upper and lower two horizontal lines are represented as Lu(1) and Ls(1), the two vertical lines, Lh(1) and Lm(1), and the number of the horizontal and vertical pixels in a minimum image size encodable for the encoder 303, MBS, the tile boundary candidate positions are respectively represented by the following expressions (1) to (4).

$$Lu(1)=\text{Int}\{y(1)/MBS\} \times MBS \quad (1)$$

$$Ls(1)=\text{Int}\{(y(1)+h(1)+(MBS-1))/MBS\} \times MBS \quad (2)$$

$$Lh(1)=\text{Int}\{x(1)/MBS\} \times MBS \quad (3)$$

$$Lm(1)=\text{Int}\{(x(1)+W(1)+(MBS-1))/MBS\} \times MBS \quad (4)$$

(INT(x) is a function to return an integral having a value x)

That is, the tile boundary candidates to cut out the n-th face region (rectangle region of interest) are represented with the upper end horizontal line Lu(n), the lower end horizontal line Ls(n), the left end vertical line Lh(n) and the right end vertical line Lm(n). Note that the values of these lines indicate pixel positions in the horizontal or vertical directions with respect to the origin.

At step S105, when the calculation of the tile boundary candidates with respect to the n-th face region has been completed, the tile divider 302 increments the variable n by "1" at step S106, and returns to step S103. Accordingly, when the determination at step S103 is "NO", it is determined that the calculation of tile boundary candidates with respect to all the face regions has been completed.

When the calculation of tile boundary candidates with respect to all the face regions has been completed, the tile divider 302 performs processing to delete unnecessary boundaries from the calculated tile boundary candidates. For this purpose, first, the process proceeds to step S107, at which the variable n is again initialized to "1". Then, at step S108, it is determined whether or not the value of the variable n is less than or equal to the number K of face regions. When it is determined that n≤K holds, the process proceeds to step S109.

At step S109, the tile divider 302 determines horizontal lines which are tile boundary candidates with respect to other face regions within a range indicated with the horizontal line tile boundary candidates Lu(n) and Ls(n) corresponding to the face region of interest, as lines to be deleted. Note that when such horizontal lines are found, they are not deleted at that point. Briefly, information (flag) indicating that the line has been determined as a line to be deleted may be set with respect to the line.

At step S110, the tile divider 302 determines vertical lines which are tile boundary candidates with respect to other face regions within a range indicated with the vertical line tile boundary candidates Lh(n) and Lm(n) corresponding to the face region of interest, as lines to be deleted. As in the case of step S109, the lines are set as lines to be deleted but not deleted at this stage.

Then the process proceeds to step S111, at which the tile divider 302 increments the variable n by "1", and returns to step S108. Accordingly, when the determination at step S108 is "NO", it is determined that the determination as to whether or not the tile boundary candidates are to be deleted with respect to all the face regions has been completed. In this case, the process proceeds to step S112, at which the tile divider 302 deletes the horizontal and vertical lines which are the tile boundary candidates determined as lines to be deleted, and outputs the remaining horizontal lines (Y-axis values) and vertical lines (X-axis values) to the encoder 303.

The encoder 303 divides the input image data in accordance with the input horizontal and vertical line coordinates, encodes the respective divided regions as tiles, and outputs generated coded data.

Figure 5:
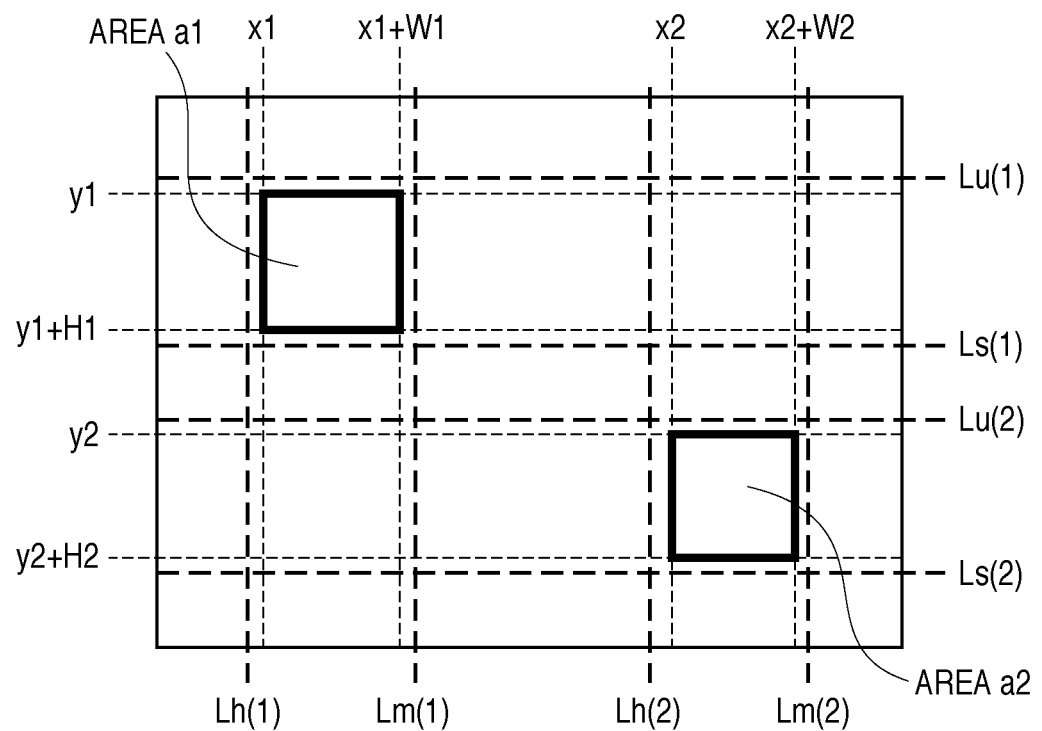
FIG. 5 illustrates an example of the positions of tile boundary candidates when two face regions exist.

Next, the flow of particular processing for setting tile boundaries will be described below using the image shown in FIG. 5. In the description, the number K of detected face regions is 2.

Then, the face region in the upper left position in the image is defined as an area a1, and the face region in the lower right position, an area a2. In this case, the tile boundary candidates are {Lu(1), Ls(1), Lh(1) and Lm(1)} and {Lu(2), Ls(2), Lh(2) and Lm(2)}.

First, the horizontal lines Lu(1) and Ls(1) as the tile boundary candidates with respect to the area a1 are selected. Because these horizontal lines are represented as Y-coordinate values, Lu(1)<Ls(1) holds.

In the processing at step S109, because the Y-coordinate values of the lines Lu(2) and Ls(2) are beyond the range of the Y-coordinates of the lines Lu(1) and Ls(1), the horizontal lines Lu(2) and Ls(2) are not determined as lines to be deleted.

Further, in the processing at step S110, because the X-coordinate values of the lines Lh(2) and Lm(2) are beyond the range of the X-coordinates of the lines Lh(1) and Lm(1), the vertical lines Lh(2) and Lm(2) are not determined as lines to be deleted.

In the area a2, similar processing is performed. At last, in FIG. 5, no tile boundary candidates with respect to the area a1 and the area a2 are determined as lines to be deleted. Accordingly, the encoder 303 divides the image in FIG. 5 into 25 tiles for an image to be encoded, and performs encoding processing by tile.

Figure 6A:
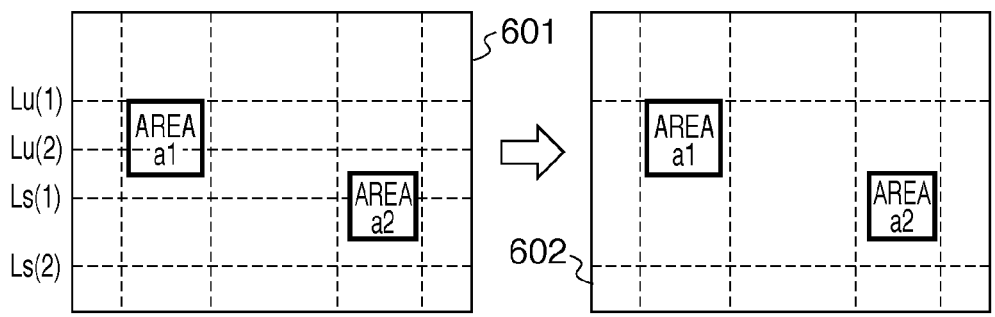
FIGS. 6A to 6D illustrate examples of tile boundaries set when two face regions exist.

Next, the processing for two face regions in positions in an image 601 shown in FIG. 6A will be described. As shown in FIG. 6A, the horizontal line Lu(2) as a tile boundary with respect to the area a2 is positioned between the horizontal lines Lu(1) and Ls(1) as tile boundaries with respect to the area a1. In other words, the horizontal line Lu(2) as a tile boundary with respect to the area a2 crosses the area a1. Accordingly, in this case, the horizontal line Lu(2) is a line to be deleted. Further, in the area a2, as the horizontal line Ls(1) as a tile boundary with respect to the area a1 crosses the area a2, this horizontal line Ls(1) is also determined as a line to be deleted. As a result, the remaining horizontal boundaries are Lu(1) and Ls(2), and encoding processing is performed on a tile-divided image 602, as shown in the figure.

Next, the processing for two face regions in positions in an image 603 shown in FIG. 6B will be described. In this case, the vertical line Lh(2) as a tile boundary with respect to the area a2 is positioned between the vertical lines Lh(1) and Lm(1) as tile boundaries with respect to the area a1. Further, the vertical line Lm(1) as a tile boundary with respect to the area a1 is positioned between the vertical lines Lh(2) and Lm(2) as tile boundaries with respect to the area a2. Accordingly, the vertical lines Lh(2) and Lm(1) are determined as lines to be deleted, and the remaining vertical lines are Lh(1) and Lm(2). Then tile division is performed as shown in an image 604 in the figure, and encoding processing is performed.

Next, the processing for two face regions in positions in an image 605 shown in FIG. 6C will be described. As it is understood from the above explanations, in the image 605, the vertical lines Lh(2) and Lm(1) and the horizontal lines Lu(2) and Ls(1) are determined as lines to be deleted. In other words, the remaining lines are the vertical lines Lh(1) and Lm(2) and the horizontal lines Lu(1) and Ls(2). Then tile division is performed as shown in the image 606 in the figure.

Next, the processing for two face regions in positions in an image 607 shown in FIG. 6D will be described. In this case, the two face regions partially overlap each other. The processing similar to that in the case of FIG. 6C is performed, and as a result, tile division as shown in an image 608 in the figure is performed.

Through the processing described above, tile boundaries for dividing an image into a plurality of tiles having the same height in the same row and the same width in the same column are determined. Thus all the detected face regions are included in a smallest possible sized tile without being divided by other tile boundaries.

Note that the present embodiment has been described as a case where face regions are set from a photograph obtained by photographing an object as a feature region of interest with a digital camera. However, as long as an image portion of interest is extracted from an image and subjected to particular processing, for example, particularly modified image processing and/or processing with particularly modified compression ratio or partial decoding, the subject of region detection is not limited to a face, but other objects may be detected. For example, an object of interest may be a photograph portion, a CG portion or a logo in a document image, or, may be a text region in a photograph such as the number plates of a plurality of cars, signboards or the like.

Modification

The above-described first embodiment has been described based on the structure in FIG. 3. Further, processing equivalent to that of the above-described first embodiment may be realized with a computer program (software) executed on a personal computer (PC) or the like.

FIG. 14 is a block diagram showing the basic configuration of an apparatus (PC or the like) when the first embodiment is realized with software.

In FIG. 14, reference numeral 1401 denotes a CPU which controls the entire apparatus using programs and data stored in a RAM 1402 and a ROM 1403, and performs image encoding processing and decoding processing to be described later.

The RAM 1402 holds programs and data from an external storage device 1407 and/or a storage medium drive 1408, or downloaded from an external device via an I/F 1409. Further, the RAM 1402 is used as a work area for execution of various processing by the CPU 1401.

The ROM 1403 holds a boot program, a setting program for the present apparatus and data.

Numerals 1404 and 1405 denote data entry and pointing devices such as a keyboard and a mouse (registered trademark) used for input of various instructions with respect to the CPU 1401.

Numeral 1406 denotes a display device having a CRT, a liquid crystal display or the like, which displays information such as an image and/or characters.

The external storage device 1407 is a large capacity information storage device such as a hard disk drive device, in which an OS, programs for image encoding and decoding to be described later, image data to be encoded, coded image data to be decoded, and the like, are stored. These programs and data are loaded into a predetermined area on the RAM 1402 under the control of the CPU 1401.

The storage medium drive 1408 reads programs and data stored on a storage medium such as a CD-ROM or a DVD-ROM, and outputs the data to the RAM 1402 or the external storage device 1407. Note that the programs for the image encoding and the decoding to be described later, image data to be encoded, coded image data to be decoded and the like may be stored in the storage medium. In such a case, the storage medium drive 1408 loads these programs and data into a predetermined area on the RAM 1402 under the control of the CPU 1401.

The I/F 1409 connects an external device to the present apparatus and enables data communication between the present apparatus and the external device. For example, image data to be encoded, coded image data to be decoded and the like can be inputted into the RAM 1402 of the present apparatus, the external storage device 1407 or the storage medium drive 1408. Numeral 1410 denotes a bus interconnecting the above-described respective units.

In the above-described structure, when processing similar to that in the first embodiment is realized with software, the CPU realizes functions corresponding to the respective processors shown in FIG. 1 with functions, subroutines and the like on the software. Further, since well-known techniques may be employed as the face detection and the encoding processing by tile and the processing corresponding to the tile divider 302 may be performed in accordance with the already-described procedure shown in FIG. 1, the explanation of the processing will be omitted.

Second Embodiment

In the first embodiment, a smallest possible size is set for a tile including a face region with its tile boundaries not crossing any other face region. In the second embodiment, crossing of some tile boundaries in face regions is permitted.

As an example where the crossing of tile boundaries in some face regions is permitted, given is a case where a large number of faces are detected and the size of a tile set by the method in the first embodiment is very large.

Figure 9:
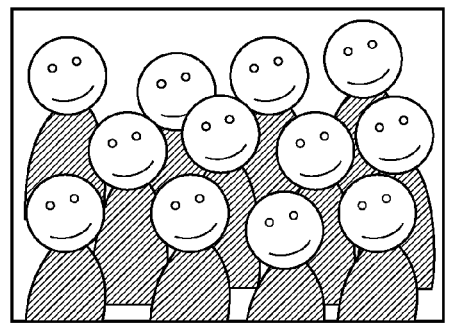
FIG. 9 illustrates an example of an image where plural persons are arrayed.

For example, in a group photograph shown in FIG. 9, many face regions exist, and some of the face regions overlap each other. Otherwise, in a non-overlapped face region, a tile boundary candidate line crosses another face region and the tile boundary is an end of the image, thereby the image cannot be subjected to tile division.

In this case, to efficiently perform tile division and encoding, it is necessary to automatically prioritize the detected face regions in the obtained photograph and determine a tile to include the entire face region and a tile to permit crossing of boundary.

In the present embodiment, a method for automatic priority assignment to detected face regions will be described below.

In a photographed image, a large sized face region can be considered as a face region having a high priority not to allow crossing of any other tile boundary. When a high priority is given to a large sized face region, a face region where a tile boundary finally crosses is included in up to maximum 4 tiles. There is a high possibility that a tile boundary crosses the large sized face region occupying a large area in the photographed image, while there is a low possibility that a tile boundary crosses a small area. Accordingly, by setting tile boundaries while giving high priorities to large sized areas, the number of face regions in which a tile boundary crosses may be reduced. Further, there is a high possibility that a large face region corresponds to a person in a front position in the photograph.

FIG. 7 is a block diagram of the image encoding apparatus according to the second embodiment. In FIG. 2, the processors to perform the same processings as those in FIG. 3 have the same reference numerals. The difference between a tile divider 302' and the tile divider 302 in FIG. 3 is that the tile divider 302' outputs, in addition to the information indicating tile boundaries to be deleted, the tile boundaries to be deleted, to the tile re-setting unit 701, and outputs the face region information from the face detector 304 to the tile re-setting unit 701 without changing the information. Accordingly, the explanation of the difference will be omitted, and the tile re-setting unit 701 will be described below.

The tile re-setting unit 701 examines the inside of a cut out tile based on the tile boundaries outputted from the tile divider 302', and performs tile boundary re-setting processing to re-set the tile boundaries once set as boundaries to be deleted, as boundaries not to be deleted. As a condition for determination upon tile boundary re-setting, when 3 or more face regions exist in 1 tile set as a subject of deletion or all the tile boundaries are at image ends, tile boundary re-setting is performed.

When it is determined that tile boundary re-setting is to be performed, a tile boundary to be added is selected from lines of a tile boundary candidate position crossing a face region. Hereinbelow, the flow of particular processing by the tile re-setting unit 701 will be described in accordance with the flowchart of FIG. 8.

Figure 10:
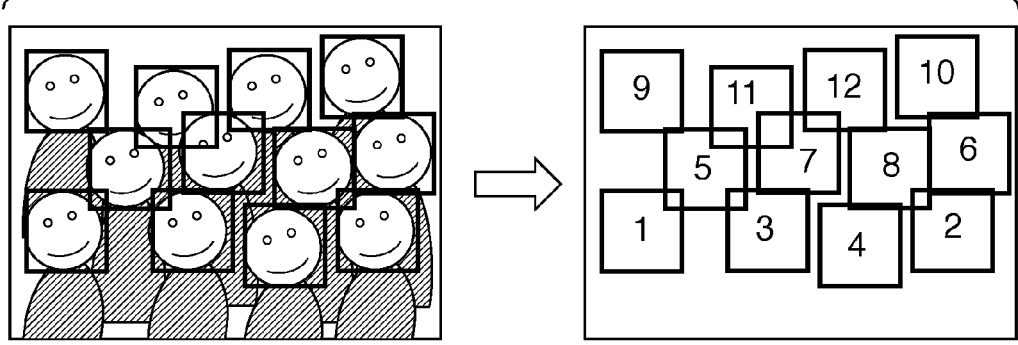
FIG. 10 illustrates an example of priority assignment to face regions in an image where plural same sized faces are arrayed.
Figure 11:
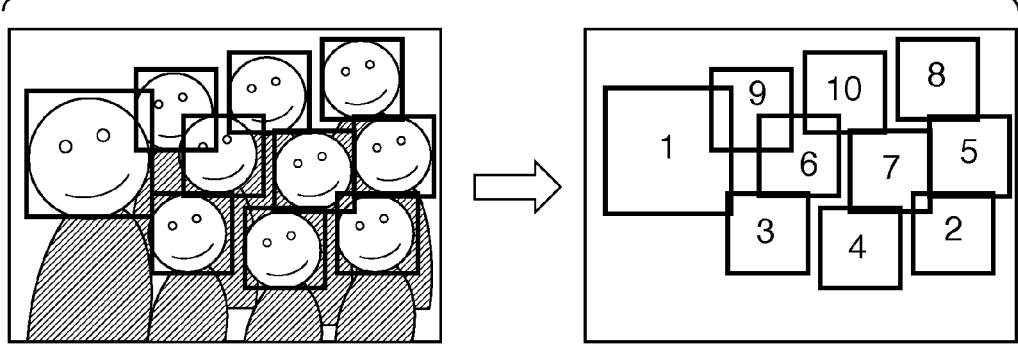
FIG. 11 illustrates an example of priority assignment to face regions in an image where one big face and a plurality of similarly sized faces are arrayed.

First, at step S801, the tile re-setting unit 701 prioritizes all the face regions (areas 1 to K) in the image. As described above, the priorities are set such that the priority of a large region is higher, and that of a small region is lower. When all the face regions have the same size, as shown in FIG. 10, the face regions are prioritized in accordance with a condition that a region in a lower stand has a higher priority and regions closer to both ends have higher priorities. Note that as shown in FIG. 11, when a large face region and plural face regions having the same size of the large face region exist, a face region in the farthest position from the large face region (first specific region) on a lower side has the highest priority. That is, the priority assignment is as shown in the table of FIG. 12.

Next, at step S802, the tile re-setting unit 701 determines, sequentially from the highest priority face region (area n), whether or not at least one of tile boundary candidates Lu(n), Ls(n), Lh(n) and Lm(n) to cut out the face region exists. When there is no tile boundary candidate (YES), as the face region of interest is cut out with optimum tile boundaries, the process moves to the next highest priority face region. On the other hand, when 1 or more tile boundary candidate exist (NO), the process proceeds to step S803.

At step S803, the tile re-setting unit 701 determines whether or not a tile boundary crosses the face region of interest (area with priority n). When it is determined that a tile boundary crosses the area of interest (YES), as the region is not the subject of tile boundary re-setting, the process moves to the next highest priority face region. When it is not determined that no tile boundary crosses the region of interest (NO), the process proceeds to step S804.

At step S804, the tile re-setting unit 701 selects a tile boundary to be added by a similar setting method to that in the first embodiment from the positional relation between the face region of interest and the highest priority face region. When the re-setting in the region of interest has been completed, the process moves to the next highest priority face region.

The above processing is repeated (step S805), and when the processing has been performed in all the face regions, the tile boundary re-setting processing is completed.

A particular example of the above-described re-setting by the tile re-setting unit 701 will be described using the image shown in FIG. 13. Note that in this example, the number of tiles having priorities are arbitrarily set by the user via an operating unit (not shown) or the like. In this example, the number N of rectangle regions with priorities is "2".

First, as in the case of the first embodiment, the tile divider 302' determines a line in a face region, which is a tile boundary candidate with respect to other face region than the face region of interest, as a line to be deleted, thereby determines tile boundaries indicated with a broken line 13a in FIG. 13.

As the size relation among the detected face regions, area a1>area a2>area a4>area a3 holds. Accordingly, higher N areas are the area a1 and the area a2. The positions of tile boundaries to be re-set are selected from the positional relation between the area a1 and the area a2. The tile boundaries to be added are selected from only the positional relation between the area a1 and the area a2 in a similar setting method to that in the first embodiment, as a result, a tile boundary candidate Lm(1) to cut out the area a1, tile boundary candidates Lh(2) and Ls(2) to cut out the area a2, indicated with a broken line 13b in FIG. 13, are set as new tile boundaries.

According to the above-described method, a largest possible number of face regions can be included in one smallest possible sized tile.

The tile re-setting unit 701 outputs the tile boundaries re-set as above to the encoder 303. The encoder 303 performs tile division and encoding processing in accordance with the result of processing by the tile re-setting unit 701.

Note that other priority assignment than the above-described priority assignment can be considered. For example, in the case of a photograph as shown in FIG. 13, in a case where a photographer takes photographs for the purpose of forming an album for his/her children, upon photographing of a family, when tile division is performed with a large sized face having higher priority, a tile boundary crosses the child's face which is a main object. Accordingly, this tile division does not match the photographer's intention. In this case, it may be arranged such that it is determined that a face region existing in a lower part of the photograph is a face in a front position regardless of face size, and tile division is performed with the face as a primary face region in which crossing of any tile boundary is not permitted. The priority setting may be performed by the user using the operating unit. For example, when this embodiment is applied to a digital camera, it may be arranged such that rectangle frames corresponding to face regions are displayed on an electronic finder, and a rectangle frame with priority is selected.

Note that as in the case of the first embodiment, it is apparent that processing corresponding to the second embodiment can be realized with a computer program.

Third Embodiment

Next, in the third embodiment, an encoding method will be described regarding a case where tile boundaries are set and the tile has large blank space in the first and second embodiments.

For example, when tile boundaries are set as shown in an image 602 in FIG. 6A, the area a1 is in an upper position in the tile and the area a2 is in a lower position in the tile. Accordingly, even only the tiles including face regions are extracted and subjected to decoding processing, unnecessary portions are also processed.

In this case, as regions to be processed other than the face regions as objects of processing are increased, the processing speed is lowered.

When a face region exists on the lower side in a tile, upon encoding, the coordinate value of the detected face region is added as a pointer to coded data, thereby the processing can be started from the head of the face region without processing blank space.

Further, when the face region exists on the upper side of the tile, upon encoding, a final pixel of the face region is specified from the coordinate value, width and height of the detected face region and added to the coded data, thereby processing on the other portion than the face region can be omitted. When the face region exists on the right or left side in the tile, similarly, a first or final pixel of the face region is added to the coded data, thereby only the face region can be processed.

Note that as in the case of the first embodiment, it is apparent that processing corresponding to the third embodiment can be realized with a computer program.

Further, generally a computer program is stored on a computer readable storage medium such as a CD-ROM. When the medium is set in a reading device (CD-ROM drive or the like) of a computer and the program is copied or installed in the system, the program can be executed. Accordingly, it is apparent that the present invention includes such computer readable storage medium in its scope.

Fourth Embodiment

In the first to third embodiments, as the tile boundary determination method, inappropriate candidates are deleted from tile boundary candidates. In the fourth embodiment, other tile boundary determination method than that in the first to third embodiments will be described.

Figure 18:
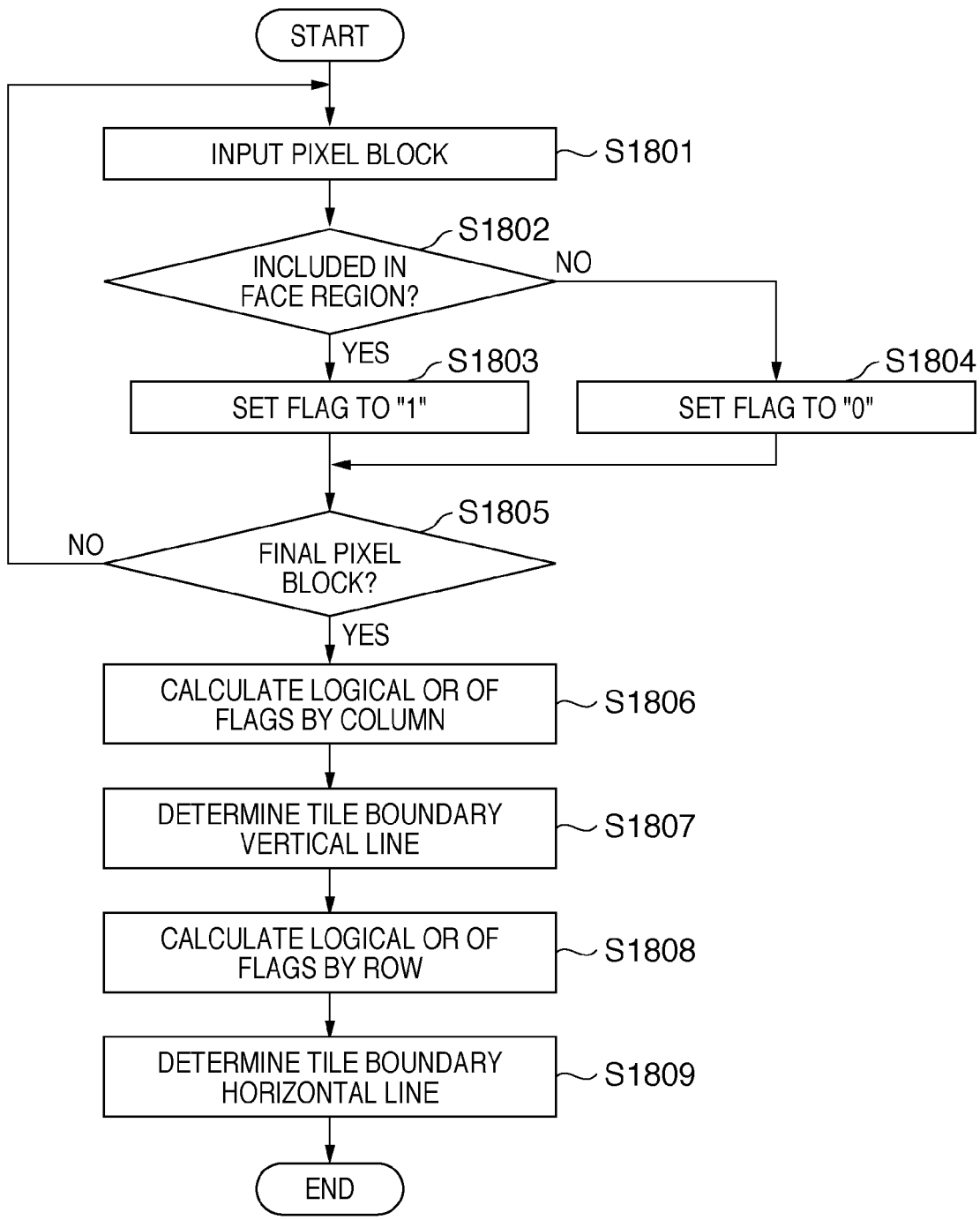
FIG. 18 is a flowchart showing the processing by the tile divider according to a fourth embodiment.

FIG. 18 shows the flow of processing in the tile divider 302 in the present embodiment. In the present embodiment, as in the case of the first embodiment, as encoding is performed by tile, a tile boundary is an integral multiple of the minimum encoding unit (in the case of JPEG encoding, 8×8).

First, the tile divider 302 divides an input image by a block as a minimum encoding unit (in the present embodiment, 8×8 pixel unit), and inputs one block (step S1801). Next, the tile divider 302 determines whether or not at least a part of the input block is included in a face region (step S1802). When it is determined that the block of interest is included in a face region, the tile divider 302 sets flag information of the block of interest to "1" at step S1803. When it is determined that the block of interest is not included in a face region, the tile divider 302 sets the flag information of the block of interest to "0" at step S1804. As the value of the flag information is "0" or "1", the flag has a binary (1-bit) value. Thereafter, the tile divider 302 determines whether or not the inspection of all the blocks has been completed at step S1805. When it is determined that the inspection has not been completed, the processing is repeated from step S1801.

When the flag values of all the blocks have been determined, the process proceeds to step S1806, at which the tile divider 302 performs OR operation (first operation) on the flags arrayed in the vertical direction by column. When N blocks are arrayed in the horizontal direction, as there are N columns, N OR results are obtained. At step S1807, the tile divider 302 sets a tile boundary (vertical line) on the x-axis from the result of OR operation in the vertical direction. More particularly, the tile boundary corresponds to a position where the flag as a result from OR operation is changed from "0" to "1" and an x-coordinate where the flag is changed from "1" to "0".

When a tile boundary has been set in all flag value change points in the vertical direction, the tile divider 302 performs OR operation (second operation) on the flags arrayed in the horizontal direction by row at step S1808. When M blocks are arrayed in the vertical direction, as there are M rows, M OR results are obtained. At step S1809, the tile divider 302 sets a tile boundary (horizontal line) on the y-axis from the result of OR operation in the horizontal direction. More particularly, the tile boundary corresponds to a position where the flag as a result from OR operation is changed from "0" to "1" and a y-coordinate where the flag is changed from "1" to "0".

A particular example of the above-described processing will be described below. In this example, two face regions exist in positions as shown in an image 603 in FIG. 6B.

Figure 6B:
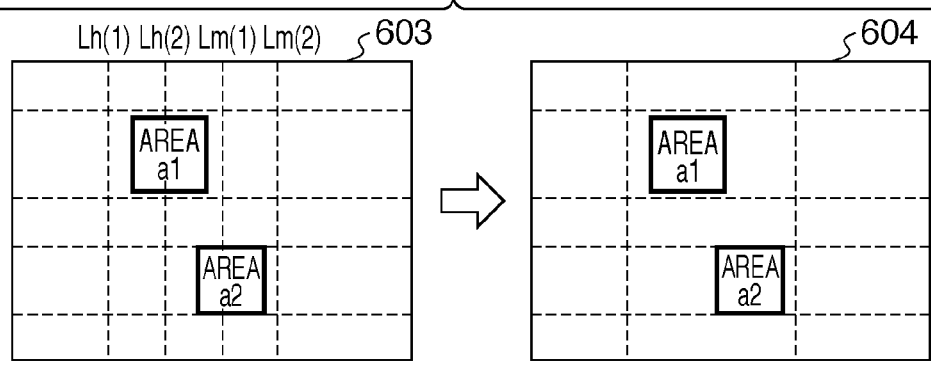
Figure 6C:
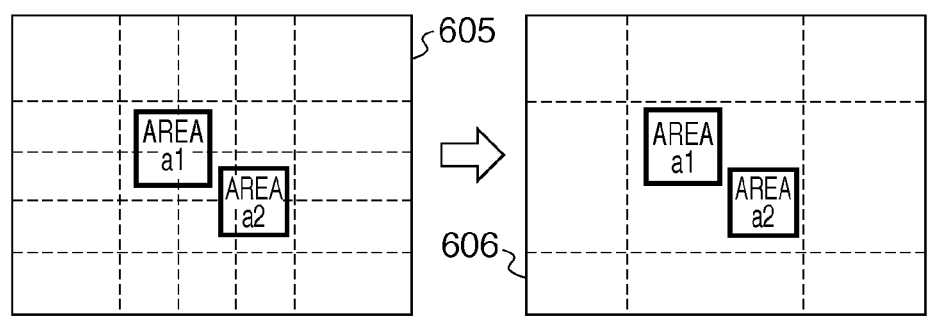
Figure 6D:
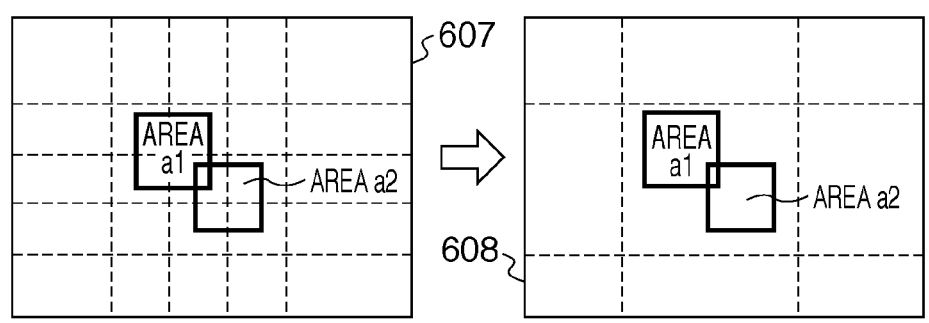

FIG. 19A shows an example where 8×8 pixel boundaries (broken lines) are added to the image 603 in FIG. 6B. That is, tile boundaries are set on the broken lines shown in FIG. 19A. The flag setting processing is performed by 8×8 pixel block in raster scan order from the upper left corner of the image in FIG. 19A. FIG. 19B shows flag values in the respective blocks when the flag setting processing has been completed in all the blocks. When at least a part of the block is included in a face region, the flag value is "1", while it is not included in a face region, the flag value is "0". Accordingly, the flag distribution is as shown in FIG. 19B.

FIG. 19C shows the result of OR operation in the vertical direction by column and the result of OR operation in the horizontal direction by row in FIG. 19B as a flag array 1901 and a flag array 1902. In the flag array 1901 and the flag array 1902, a tile boundary is set on a boundary from "0" to "1" and a boundary from "1" to "0", thereby the result in an image 604 shown in FIG. 6B can be obtained.

The tile boundaries are determined by the above-described method, and as in the case of the first embodiment, all the detected face regions are included in a smallest possible sized tile without being segmented by crossing of tile boundary. Accordingly, the tile setting processing in the fourth embodiment may be adopted in place of that in the first embodiment.

Modification

In the first to fourth embodiments, it is presumed that with respect to a particular feature region e.g. an object such as a face region detected by face recognition upon photographing, image processing is performed such that only a tile including the detected region is decoded. Accordingly, it is necessary to avoid degradation of the object of interest.

However, upon tile division and encoding, to suppress tile distortion, filter processing may be performed on overlapped tiles. In this case, when a single tile is decoded, image quality may be degraded in a tile boundary portion due to incorrect decoding. To avoid the influence of image quality degradation in a tile boundary portion on an object of interest, it is necessary to set a tile boundary slightly outside a detected region.

For example, when overlapped tiles are subjected to filter processing by 4×4 tile as shown in FIG. 16, as image quality degradation occurs within a 2-pixel tile boundary range as shown in FIG. 17, a tile boundary is set on the periphery of the detected region of the object of interest by at least 2 pixels. This setting is performed by the face detector 304. That is, the face detector 304 detects a face region in its normal processing, then outputs coordinates of a rectangle of the detected face region, which are expanded by 2 pixels in horizontal and vertical ends, to the tile divider 302. Note that a corrector to correct the coordinates of a detected face region may be provided between the face detector 304 and the tile divider 302, or the correction may be performed in the tile divider 302.

By the methods as described above, it is possible to determine appropriate parameters for setting the positions of tile boundaries to suppress image quality degradation in an object of interest.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-324708, filed Dec. 19, 2008, and No. 2009-216171, filed Sep. 17, 2009, which are hereby incorporated by reference herein in their entirety.

What is claimed is:

1. An image encoding apparatus for dividing an image into two or more rectangle regions and encoding image data in each rectangle region, comprising:
a region detector that detects one or more specific region in image data;
a tile divider that determines positions of a vertical line and a horizontal line as boundaries to divide said image into a plurality of tiles whose size are variable and which have the same height in the same row and the same width in the same column, in accordance with coordinates of each rectangle region including each specific region detected by said region detector; and
an encoder that divides said image data in accordance with the horizontal and vertical lines set by said tile divider and encodes a partial image in each divided region as said tile,
wherein, if said region detector detects specific regions more than a predetermined number, said tile divider divides said image into the plurality of tiles in accordance with coordinates of rectangle regions of only N specific regions among the detected specific regions, where N is determined in accordance with a predetermined condition.

2. The apparatus according to claim 1, wherein, when vertical lines at left end and right end of a rectangle region of interest including an n-th specific region detected by said region detector are defined as tile boundary candidate vertical lines Lh(n) and Lm(n), and horizontal lines at upper end and lower end of said rectangle region of interest, as tile boundary candidate horizontal lines Lu(n) and Ls(n),
said tile divider determines a vertical line of another rectangle region existing in the range of the vertical lines Lh(n) and Lm(n) of said rectangle region of interest as a vertical line to be deleted,
then determines a horizontal line of another rectangle region existing in the range of the horizontal lines Lu(n) and Ls(n) of said rectangle region of interest as a horizontal line to be deleted, and
determines a vertical line not to be deleted and a horizontal line not to be deleted as boundaries to divide said image into tiles.

3. An image encoding apparatus for dividing an image into rectangle regions and encoding image data in each rectangle region, comprising:
a region detector that detects a specific region in image data;
a tile divider that determines positions of a vertical line and a horizontal line as boundaries to divide said image into a plurality of tiles having the same height in the same row and the same width in the same column, in accordance with coordinates of each rectangle region including each specific region detected by said region detector; and
an encoder that divides said image data in accordance with the horizontal and vertical lines set by said tile dividing unit and encodes a partial image in each divided region as said tile,
wherein, when a minimum encoding processing unit of said encoder is defined as a pixel block,
said tile divider, comprising:
a determination unit that determines whether or not each pixel block in said image is included in any specific region detected by said region detector, and determines the result of determination as binary flag information of each pixel block;
a first operation unit that obtains a logical OR of said flag information of pixel blocks arrayed in a vertical direction;
a second operation unit that obtains a logical OR of said flag information of pixel blocks arrayed in a horizontal direction; and
a determination unit that determines positions of horizontal line and vertical line to tile-divide said image in accordance with the result of operation by said first operation unit and the result of operation by second operation unit.

4. The apparatus according to claim 1,
wherein said region detector outputs information indicating a position of a region including a specific region in image data and a position of the specific region.

5. The apparatus according to claim 1, wherein said encoder stores coordinates of lines indicating said boundaries and information indicating whether or not each tile includes said specific region into a header of coded data.

6. An image encoding apparatus for dividing an image into rectangle regions and encoding image data in each rectangle region, comprising:
a region detector that detects a specific region in image data;
a tile divider that determines positions of a vertical line and a horizontal line as boundaries to divide said image into a plurality of tiles having the same height in the same row and the same width in the same column, in accordance with coordinates of each rectangle region including each specific region detected by said region detector;

an encoder that divides said image data in accordance with the horizontal and vertical lines set by said tile divider and encodes a partial image in each divided region as said tile, a setting unit that sets a number N of specific regions with priorities; and a re-setting unit that, when a rectangle region of interest represented with lines not to be deleted includes the specific regions more than the number N set by said setting unit, re-sets horizontal and vertical lines determined as lines to be deleted with respect to higher N specific regions arrayed in accordance with a predetermined condition in said rectangle region of interest, as lines not to be deleted, wherein said encoder divides said image data in accordance with the result of processing by said re-setting unit and encodes each divided region as said tile.

7. The apparatus according to claim 6, wherein said condition includes size and position of said specific region, and a distance from a specific region with the highest priority.

8. The apparatus according to claim 1, wherein when said encoder performs filtering processing over tiles, said region detector outputs a region wider in horizontal and vertical directions by a predetermined number of pixels than a rectangle circumscribing a detected specific region, as a detection result.

9. A control method for an image encoding apparatus for dividing an image into two or more rectangle regions and encoding image data in each rectangle region, comprising:

a region detection step of detecting one or more specific region in image data;

a tile dividing step of determining positions of a vertical line and a horizontal line as boundaries to divide said image into a plurality of tiles whose size are variable and which have the same height in the same row and the same width in the same column, in accordance with coordinates of each rectangle region including each specific region detected at said region detection step; and an encoding step of dividing said image data in accordance with the horizontal and vertical lines set at said tile dividing step and encoding a partial image in each divided region as said tile, wherein, if the detecting step detects specific regions more than a predetermined number, said tile dividing step divides said image into the plurality of tiles in accordance with coordinates of rectangle regions of only N specific regions among the detected specific regions, where N is determined in accordance with a predetermined condition.

10. A non-transitory computer readable storage medium holding a computer program read and executed by a computer, to cause said computer to perform the steps in the method according to claim 9.

11. A control method for an image encoding apparatus for dividing an image into rectangle regions and encoding image data in each rectangle region, comprising:

a region detection step of detecting a specific region in image data;

a tile dividing step of determining positions of a vertical line and a horizontal line as boundaries to divide said image into a plurality of tiles having the same height in the same row and the same width in the same column, in accordance with coordinates of each rectangle region including each specific region detected at said region detection step; and an encoding step of dividing said image data in accordance with the horizontal and vertical lines set at said tile dividing step and encoding a partial image in each divided region as said tile, wherein, when a minimum encoding processing step of said encoding step is defined as a pixel block, said tile dividing step, comprising:

a determination step of determining whether or not each pixel block in said image is included in any specific region detected by said region detection step, and determines the result of determination as binary flag information of each pixel block;

a first operation step of obtaining a logical OR of said flag information of pixel blocks arrayed in a vertical direction;

a second operation step of obtaining a logical OR of said flag information of pixel blocks arrayed in a horizontal direction; and a determination step of determining positions of horizontal line and vertical line to tile-divide said image in accordance with the result of operation by said first operation step and the result of operation by second operation step.

12. A control method for an image encoding apparatus for dividing an image into rectangle regions and encoding image data in each rectangle region, comprising:

a region detection step of detecting a specific region in image data;

a tile dividing step of determining positions of a vertical line and a horizontal line as boundaries to divide said image into a plurality of tiles having the same height in the same row and the same width in the same column, in accordance with coordinates of each rectangle region including each specific region detected at said region detection step; and an encoding step of dividing said image data in accordance with the horizontal and vertical lines set at said tile dividing step and encoding a partial image in each divided region as said tile, a setting step of setting a number N of specific regions with priorities; and a re-setting step of, when a rectangle region of interest represented with lines not to be deleted includes the specific regions more than the number N set by said setting step, re-setting horizontal and vertical lines determined as lines to be deleted with respect to higher N specific regions arrayed in accordance with a predetermined condition in said rectangle region of interest, as lines not to be deleted, wherein said encoding step divides said image data in accordance with the result of processing by said re-setting step and encodes each divided region as said tile.

* * * * *